Oct. 21, 1969  R. E. HORNBRUCH  3,473,577
STITCHING APPARATUS

Filed May 5, 1967  5 Sheets-Sheet 1

INVENTOR.
RAYMOND E. HORNBRUCH
BY Richard H. Berneike
ATTORNEY

INVENTOR.
RAYMOND E. HORNBRUCH
BY Richard H Berneike
ATTORNEY

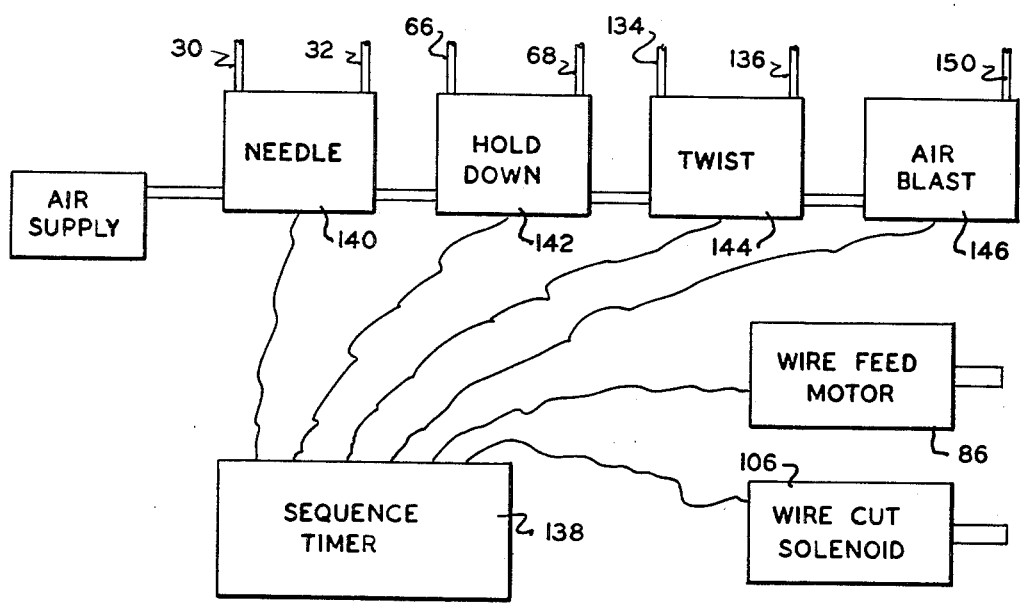
FIG. 9
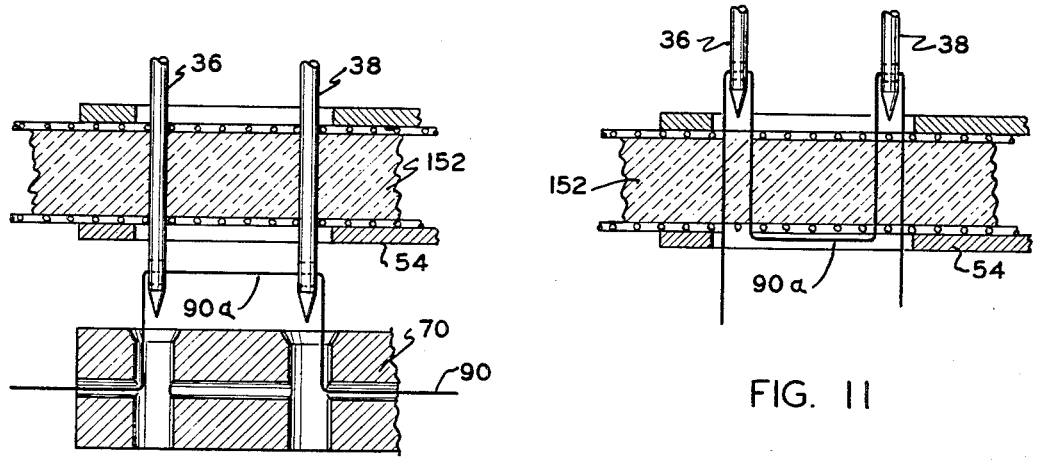
FIG. 10
FIG. 11
INVENTOR.
RAYMOND E. HORNBRUCH
BY Richard H Berneike
ATTORNEY INVENTOR.
RAYMOND E. HORNBRUCH
BY Richard H. Berneike
ATTORNEY United States Patent Office 3,473,577
Patented Oct. 21, 1969

3,473,577
STITCHING APPARATUS
Raymond E. Hornbruch, Wayne, Pa., assignor to Refractory & Insulation Corporation, Port Kennedy, Pa., a corporation of Delaware
Filed May 5, 1967, Ser. No. 636,482
Int. Cl. B21f 45/16, 7/00
U.S. Cl. 140—93                                 6 Claims

ABSTRACT OF THE DISCLOSURE

An apparatus for inserting U-shaped wires through materials and for twisting together the free ends of the wires to stitch the materials together. Two needles are inserted through the material and threaded with the wire. The needles are then withdrawn from the material pulling the free ends of the wire through the material and through a twister. The twister is then rotated to twist together the wire ends.

BACKGROUND OF THE INVENTION

Although the apparatus and technique of the present invention is adaptable for stitching together many materials by twisting together the free ends of U-shaped wires inserted through the material, the invention was devised for and is particularly suited for stitching together insulating blankets and the invention will therefore be described with particular reference to such use. These insulating blankets are commonly formed from one or more layers of mineral wool blankets of desired thickness sandwiched between wire mesh material. This wire mesh may be of any desired form but it is conventionally formed from either chicken wire or metal lath or a combination of the two. The sandwich of mesh and mineral wool is held together and to the desired thickness by means of U-shaped wires inserted through the sandwich with the two free ends twisted together.

These prior art stitching operations have traditionally been done by hand. Two needles mounted on a common base are manually inserted through the sandwich which is held to the desired thickness in a frame. A wire of the required length is then inserted through the eyes of the needles and the needles are withdrawn pulling the free ends of the wires through the sandwich to form the wire generally into a U-shape. The needles, with the wire ends still held in the eyes, are then manually twisted thus twisting the wire ends and forming the stitch. This manual operation is obviously quite time consuming and expensive and lacks uniformity and quality.

SUMMARY OF THE INVENTION

The present invention was devised to mechanize the prior art, manual stitching operation. The invention involves holding the sandwich in position in the stitching mechanism and inserting the two needles down through a twisting mechanism, the sandwich, and into a threading means. A continuous wire is fed through the eyes of the needles in the threading means and sheared to the required length. The needles are then withdrawn pulling the wire ends up through the sandwich and the twisting mechanism. The twisting mechanism is then rotated to twist the wire ends and complete the operation.

BRIEF DESCRIPTION OF THE DRAWINGS

FIGURE 9 is a schematic illustration of the controls for the stitching mechanism;
FIGURES 10 and 11 illustrate two stages of the operation of the invention.

DESCRIPTION OF THE PREFERRED EMBODIMENT

Figure 1:
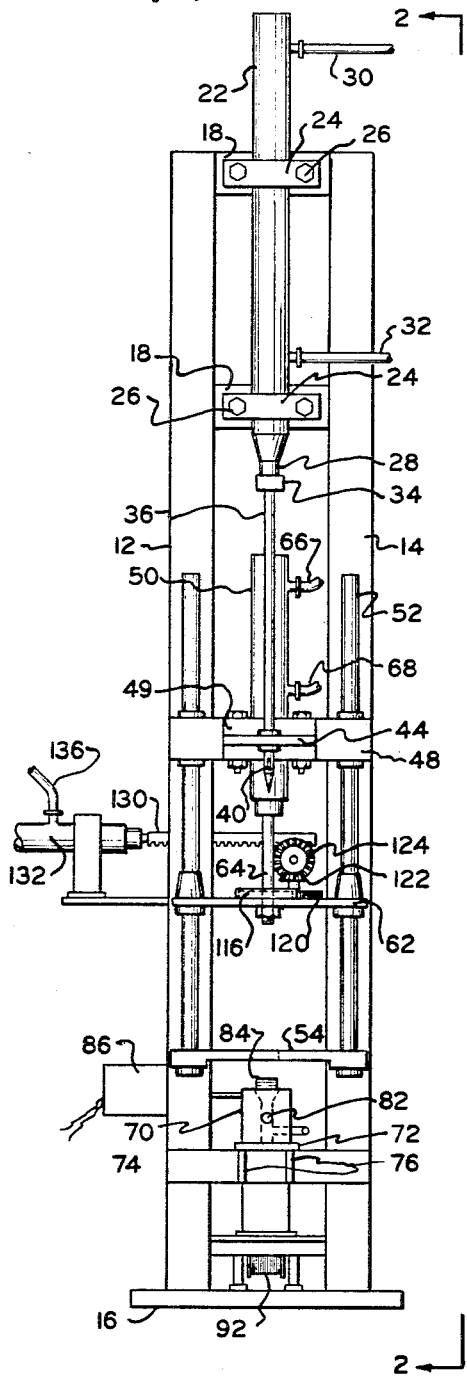
FIGURE 1 is a front elevation view of the stitching mechanism of the present invention.
Figure 2:
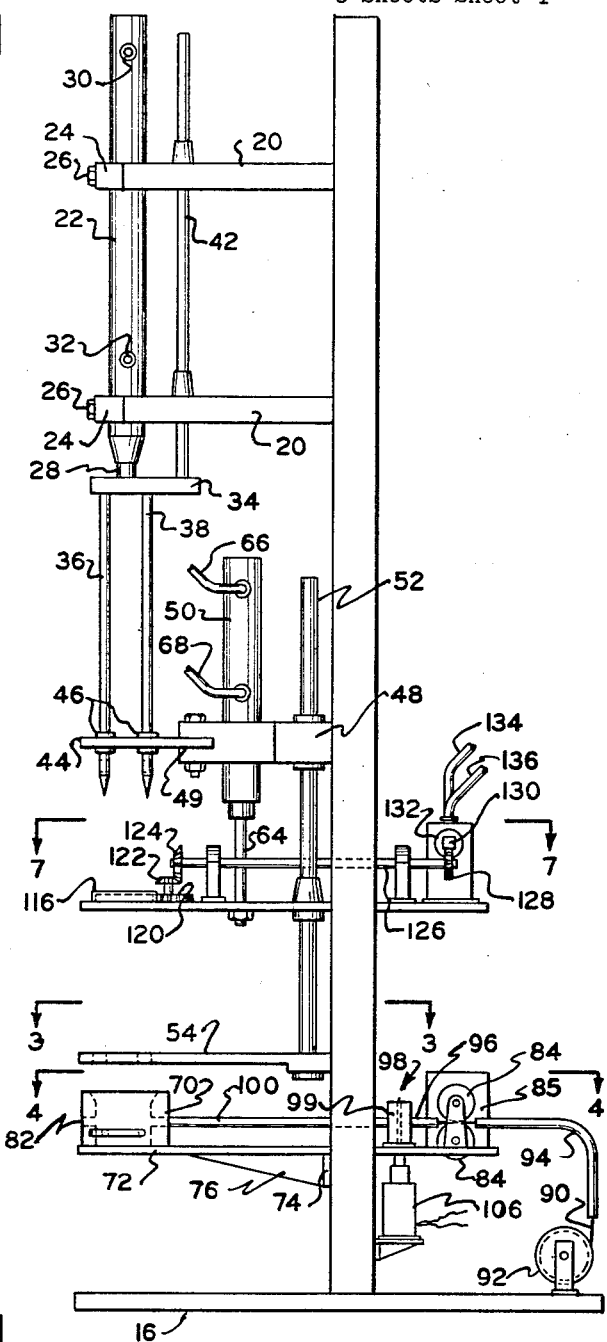
FIGURE 2 is a side elevation view.

Referring first to FIGS. 1 and 2, the apparatus comprises a supporting frame formed by two upright members 12 and 14 which are mounted on the base 16 and which are connected by cross members 18. As many cross members may be provided as necessary to provide the proper supporting structure. Extending outwardly from the cross members 18 are mounting brackets 20 which support a pneumatic cylinder 22. This pneumatic cylinder is attached to the mounting brackets by means of the caps 24 and bolts 26. This conventional pneumatic cylinder incorporates a piston to which is attached the rod 28. The introduction of air pressure through pneumatic line 30 causes the piston and the rod 28 to be forced downwardly while the introduction of air pressure through pneumatic line 32 causes the piston and rod 28 to return to the raised position as illustrated. Attached to the lower end of the rod 28 is a needle mounting block 34. Two needles 36 and 38 are attached to the mounting block 34 in spaced relationship as shown in the drawings. The eyes 40 of the needles are aligned with and directed toward each other. Also attached to the mounting block 34 is a guide rod 42 which extends from the mounting block upwardly through apertures in the mounting brackets 20. This guide rod serves to maintain the needle mounting block in proper alignment.

Located below the needle mounting block 34 is a needle guide 44 which has two holes 46 therein which are algined with the needles 36 and 38 and through which the needles pass. This needle guide is located vertically such that the needles when in a raised position will not be withdrawn or disengaged from the holes 46. The needles will thus always be maintained in proper alignment by the needle guide. The needle guide 44 is attached to the frame members 12 and 14 by means of a T-shaped clamping block 48 which is suitably attached, such as by welding, to the frame members. The needle guide 44 fits into a slot 49 in the clamping block 48 and is held in place therein by means of bolts.

Suitable means may be provided for adjusting the position of the needle guide 44 within the clamping block 48 to properly align the needles 36 and 38. The clamping block 48 also serves to mount a pneumatic cylinder 50 the purpose of which will be discussed hereinafter. The clamping block further has therein apertures for accepting the guide rods 52.

Figure 3:
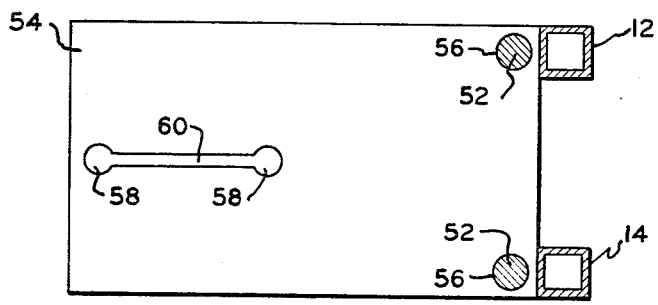
FIGURE 3 is a plan view of the supporting platform.

Mounted below the needle guide 44 is a material supporting platform 54 which supports in position the material which is to be stitched. This platform is suitably attached to the frame members 12 and 14 and includes openings 56 for accepting the above-mentioned guide rods 52. This can more clearly be seen from FIG. 3 which is a plan view of this platform. The platform further includes holes 58 which are aligned with and through which the needles reciprocate. These holes 58 are connected to each other by a slot 60.

Figure 7:
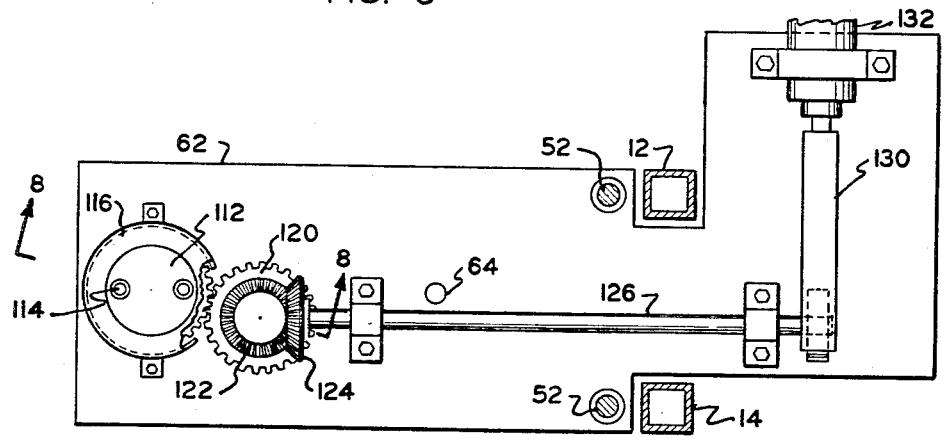
FIGURE 7 is a plan view of the hold-down and twisting mechanism.

Mounted between the needle guide 44 and the material supporting platform 54 is a material hold-down plate 62 as shown in FIGS. 1, 2 and 7. This hold-down plate is rigidly attached to the guide rods 52 and is further attached to the pneumatic cylinder 50 by means of the reciprocating rod 64. When air is introduced into the pneumatic cylinder through line 66, the rod 64 is forced downwardly thus causing the hold-down plate 62 together with the guide rods 52 to be lowered. The guide rods 52, which support the hold-down plate 62, are thus reciprocated within the apertures in the clamping block 48 and the material supporting platform 54. The hold-down plate 62 is lowered to a position such that the material to be stitched will be compressed to slightly less than the desired thickness and held in such a position during the stitching operation. When air is introduced into pneumatic cylinder 50 from line 68, the rod 64 and the hold-down plate 62 will be raised again in the proper timed sequence to obtain a desired twist. Mechanical means are provided to limit the travel of rod 64 in pneumatic cylinder 50 so as to alter both the raised and lowered positions of the hold-down plate 62 to accommodate materials of various thicknesses. Also mounted on the hold-down plate 62 is a twisting mechanism which will be described hereinafter.

Figure 4:
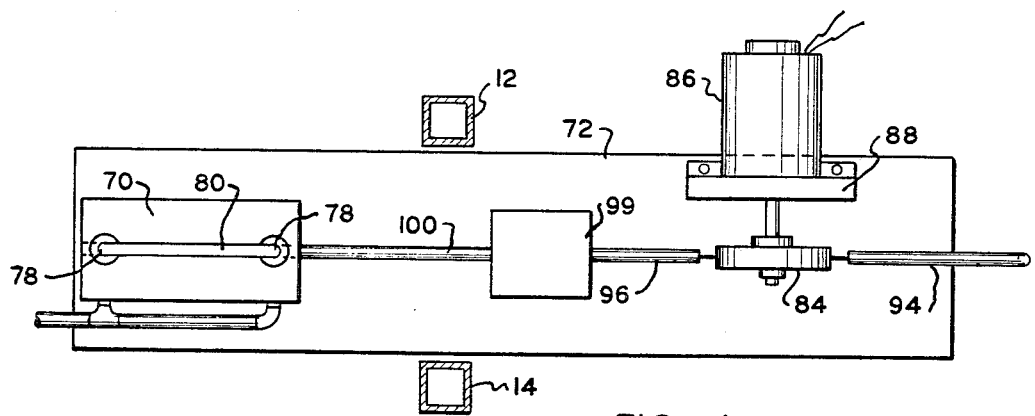
FIGURE 4 is a plan view of the threading block, and wire feed and cutting mechanism.

Mounted below the material supporting platform 54 is a threading block 70 mounted on the plate 72 as shown in FIGS. 1, 2 and 4. This plate 72 is attached to the frame members 12 and 14 by means of the cross bar 74 and the brace 76. As most clearly shown in FIG. 5, the threading block 70 has therein holes 78 which extend downwardly through the threading block and which are aligned with the needles 36 and 38. The tops of these holes are countersunk or tapered outwardly so as to more readily accept the needles. Extending between the holes 78 throughout the length thereof is a slot 80. Extending through the block horizontally from front to back is another hole 82 which intersects the holes 78. The apparatus is adjusted such that when the needles are in a lowered position, the eyes 40 of the needles will be aligned with the hole 82 such that a wire may be inserted through the hole 82 and through the needle eyes. Needle eyes 40 are tapered outward on both sides to accept stitching wire 90 and facilitate needle alignment and universal installation.

Also mounted on plate 72 at the rear thereof is a wire feeding mechanism as shown in FIGS. 2 and 4. This mechanism comprises wire feeding rollers 84 and drive motor 86 all of which are mounted on bracket 88. The wire 90 which comes from reel 92 is fed through conduit 94 to the wire feeding rollers 84. From the feeding rollers the wire is fed through conduit 96 to a wire cutting mechanism 98. The wire passes through the wire cutting mechanism and through conduit 100 to the hole 82 in the needle threading block while holding the needle eyes 40 in position to accept the wire.

The wire cutting mechanism 98 comprises a block 99 with aligned holes 102 and 103 extending therethrough through which the wire 90 passes. Mounted in the block 99 is a knife blade 104 with a hardened tapered hole 105 which is attached to a solenoid 106. When activated, the solenoid causes the knife blade 104 to rise rapidly to sever the wire 90 by shearing against hardened surface of block 99. The cutting mechanism 98 including its solenoid 106 is mounted such that is may be moved back and forth on its supports so that the wire cutoff position may be changed. By such an adjustment, the length of the wire for a series of stitches may be changed when a corresponding adjustment is made in the wire feeding arrangement. This may be accomplished by either rotating the drive rollers 84 faster, such as by employing a variable speed motor, or by rotating them for a longer period of time. The conduit 100 is detachable so that any malfunctions such as a jammed wire may be corrected.

Figure 8:
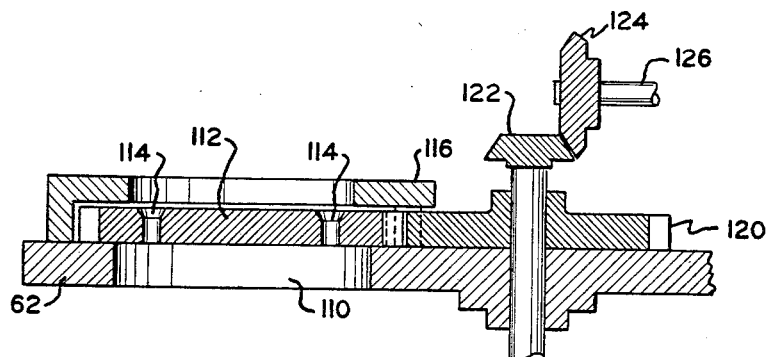
FIGURE 8 is a cross section view of a portion of the hold-down and twisting mechanism taken along line 8—8 of FIGURE 7.

Next to be described is the twisting mechanism which is mounted on the hold-down plate 62 and which can be seen in FIGS. 1, 2, 7 and 8. A circular opening 110 is located in the hold-down plate 62 as shown in FIG. 8 directly below and in the path of the needles. Positioned over this opening 110 is a wire twisting disk 112 which has two holes 114 therethrough. This disk is retained over the opening 110 and mounted for rotation by means of the retaining ring 116 which surrounds the disk 112 and has a lip extending over the disk. On one side of the retaining ring there is an opening 118 through which extends a portion of a gear 120 which is rotatably mounted on the hold-down plate 62. The gear teeth on the periphery of gear 120 engage gear teeth located on the periphery of disk 112. Thus by rotating gear 120, disk 112 will be rotated. Attached to gear 120 is a beveled gear 122 which is engaged by and rotated by beveled gear 124. Shaft 126 extends from the beveled gear 124 to gear or pinion 128. This pinion is engaged by the rack 130 which is attached to and driven by a pneumatic cylinder 132. In operation, air is admitted to the pneumatic cylinder 132 through line 134 which causes the rack 132 to reciprocate thus causing the intermediate gears to rotate the twisting disk 112. Air is then admitted to the pneumatic cylinder 132 through line 136 to return the rack and twisting disk to the normal position.

FIG. 9 of the drawings illustrates the controls for the stitching apparatus. These controls comprise a sequence timer generally indicated at 138 which controls the sequence and duration of operation of each of the separate functions of the apparatus. This timer may be of any conventional design such as a stacked rotary switch or a more sophisticated electronic design. The particular details of this timer form no part of the present invention. As can be seen, the timer is electrically connected to solenoid valves 140, 142, 144, and 146 for controlling, respectively, the needle reciprocation, the hold-down plate reciprocation, the twister operation, and a cleaning air blast which will be described hereinafter. The sequence timer further controls the wire feed motor 86 and the cutter solenoid 106. By changing the duration of the signal to the wire feed motor the length of wire feed and thus the length of wire for each stitch may be changed.

Figure 5:
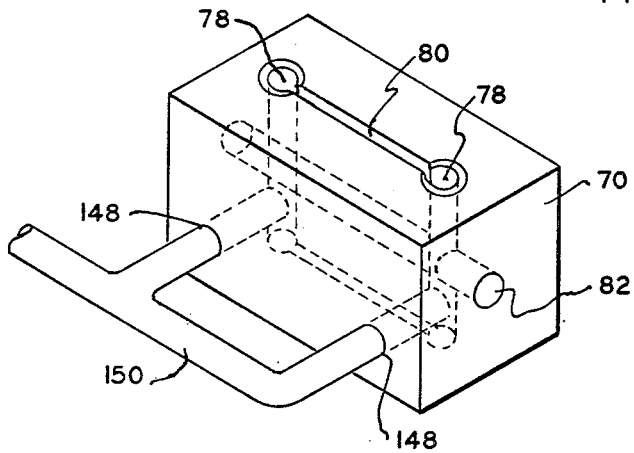
FIGURE 5 is a perspective view of the threading block.
Figure 6:
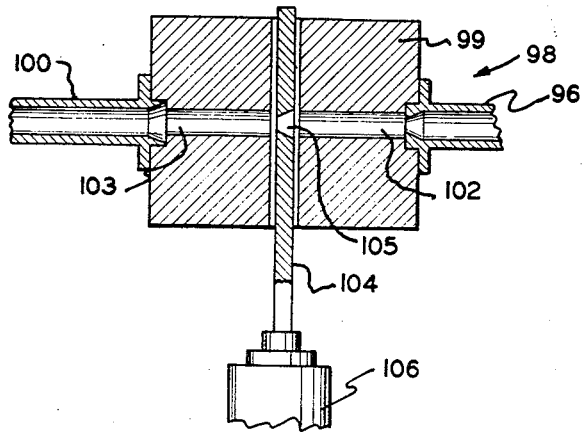
FIGURE 6 is a view partially in cross section illustrating the wire cutting mechanism.

Since foreign material, such as slag from the mineral wool, often drops into or is carried by the needles into the holes in the threading block 70, it is desirable that means be provided to remove such material. As shown in FIG. 5, two holes 148 extend from the side of the block into the lower portion of the holes 78. Connected to the holes 148 is an air supply line 150 which is connected to the air blast solenoid 146. At a desired portion of the cycle, air is forced through these holes 148 and holes 78 to blow out the foreign material.

Figure 12:
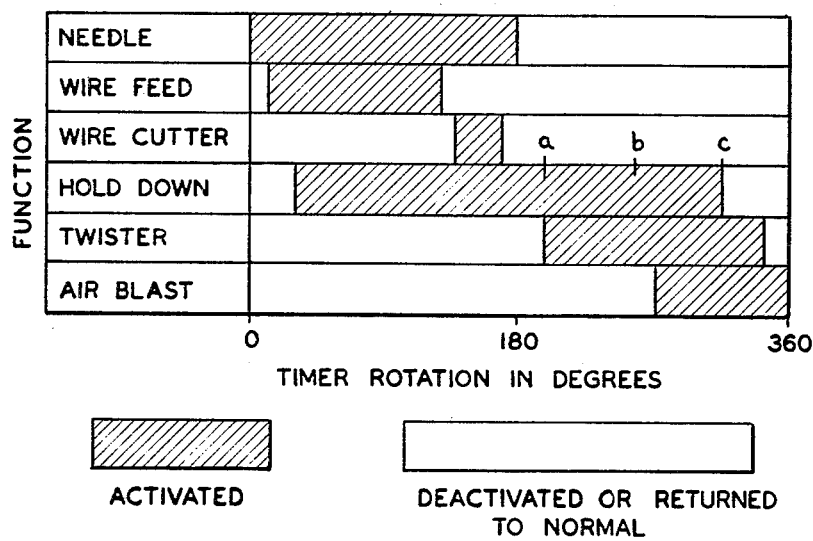
FIGURE 12 is a graph illustrating the sequence of the various operations.
Figures 13A, 13B, 13C:
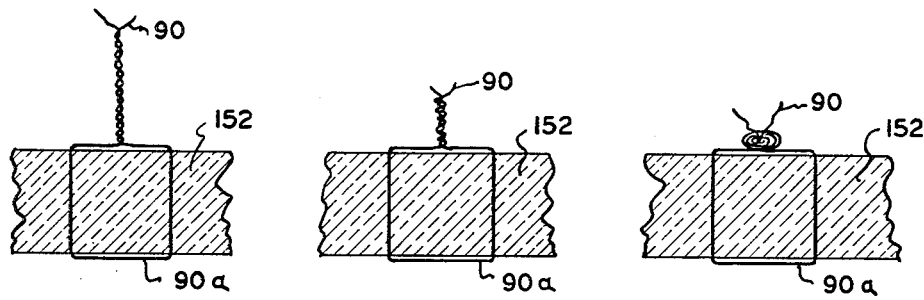
FIGURES 13a, b, and c illustrate the various types of wire twists available.

The operation of the stitching mechanism will now be described with particular references to FIGS. 10, 11, and 12. FIG. 12 graphically illustrates the relationship of the operation of the various portions of the apparatus with respect to each other while FIGS. 10 and 11 illustrate the needles drawing the wire from the threaded block 70 up through the material supporting platform 54 and material 152. Initially the pneumatic cylinder 22 is actuated so as to drive the needles downwardly at about the same time that the wire feed motor is actuated to begin feeding the wire. During the latter part of the needle piercing operation, the pneumatic cylinder 50 is actuated so as to lower the hold-down plate 62 onto the material. This compresses the material to the desired thickness after the needles have completed or substantially completed the piercing operation. With the needles in the lowered position, the wire 90 is fed into the hole 82 in the threading block 70 and fed through the eyes 40 of the needles. As soon as the wire feeding has been completed, the wire cutter is momentarily actuated so as to cut off and provide a wire of the desired length. With the cylinder 50 still actuated so as to keep the hold-down plate in the lowered position, the needle actuating cylinder 22 is deactivated or returned to normal so as to raise the needles. As can be seen in FIG. 10, this initially draws the center portion 90a of the wire 90 upwardly through the holes 58 and slot 60 of supporting platforms 54 and up against the bottom of the material 152. As the needles are raised further, the wire slips through the eyes 40 of the needles to draw the wire ends up through material. This will also draw the wire ends up through the holes 114 in the twisting disk 112. At any time after the needles have passed upwardly through the holes in the twisting disk, the twisting disk may be rotated so as to twist the wire ends. After the twisting disk has begun to rotate, the pneumatic cylinder 50 may be deactivated or returned to normal so as to raise the hold-down plate 62. The time relationship between the operation of the twisting mechanism and the raising of the hold-down plate may be varied so as to obtain various types of twists in the wire. For instance, if the hold-down plate is raised at point a in FIG. 12 when the twister begins operating, a rather loose, elongated twist will be obtained as shown in FIG. 13a. However, if the hold-down plate is not raised until later, such as at points a or c, in FIG. 12, a more compact and tighter twist will be formed such as shown in FIGS. 13b and 13c, respectively. At any time after the needles have been withdrawn from the threading block 70 and before the next cycle has begun, the air blast may be admitted to the threading block through line 150 and holes 148 to clean out the foreign material. The apparatus is then ready to begin another cycle.

While a preferred embodiment of the invention has been described, it will be understood that this is merely illustrative and that changes may be made without departing from the spirit and scope of the invention as claimed.

I claim:

1. Apparatus for pulling the ends of a piece of wire-like material through a layer of material into a generally U-shaped pattern and twisting the ends of said wire-like material together to form a stitch comprising:
  (a) a pair of reciprocal needles each having an eye therethrough with said eyes being generally aligned with each other;
  (b) a support for supporting said layer of material in the path of travel of said reciprocal needles;
  (c) means for reciprocating said needles from a retracted position in which said needles are located on a first side of said layer of material to an extended position in which said needles form holes in said layer of material and extend through said layer of material and said needle eyes are located on a second side of said layer of material;
  (d) means located on said second side of said layer of material for inserting said piece of wire-like material through said needle eyes when said needle eyes are located on said second side whereby said piece of wire-like material will be slidably positioned in said needle eyes;
  (e) means for reciprocating said needles from said extended position to said retracted position whereby the two ends of said wire-like material slide through said needle eyes and are drawn up through said holes formed in said layer of material; and
  (f) means located on said first side of said layer of material for engaging said ends of said piece of wire-like material which have been pulled through said layer of material upon retraction of said needles and for twisting said ends to form said stitch.

2. Apparatus as claimed in claim 1 wherein said means (f) for engaging and twisting said ends of said piece of wire-like material comprises:
  (a) a plate rotatably mounted in a plane generally normal to the direction of travel of said needles and having two holes extending therethrough generally normal to the plane of said plate, said plate normally positioned such that said two holes are aligned respectively with said two needles and such that said needles in said retracted position are withdrawn from said two holes in said plate whereby said ends of said wire-like material will be pulled up through said two holes; and
  (b) means for rotating said plate when said ends of said wire-like material extend through said two holes to twist said ends together.

3. Apparatus as claimed in claim 2 wherein said plate is rotatably mounted on a hold-down means, said hold-down means mounted for reciprocal movement between a retracted position and a position in contact with said layer of material to hold said layer of material in place and further including means for controlling the time relationship between the retraction of said hold-down means and the rotation of said plate whereby the pattern of said twist in said wire-like material can be altered.

4. Apparatus as claimed in claim 1 wherein said means (d) for inserting said piece of wire-like material through said needle eyes comprises:
  (a) a threading block including two needle holes therein extending generally parallel to each other and in the direction of travel of said needles and being alinged respectively with said needles, a threading hole extending through said block in a direction generally normal to said needle holes and intersecting said needle holes at a location corresponding to the position of the needle eyes in the extended position and a slot interconnecting said needle holes at least from the surface of said threading block at which said needles enter said needle holes to the point of intersection of said needle holes and said threading holes;
  (b) means for intermittently feeding said wire-like material into said threading hole in said threading block and through said needle eyes when in the extended position; and
  (c) means for cutting said wire-like material to the desired length.

5. Apparatus as claimed in claim 1 wherein said support (b) comprises a generally horizontal platform underlying said layer of material, said platform having two holes extending vertically therethrough and aligned respectively with said two needles, said platform further including a slot extending vertically therethrough and between said two holes whereby said needles may pass through said two holes and said wire-like material may pass through said slot.

6. Apparatus for stitching together material such as insulation blankets or the like comprising:
  (a) two vertically extending needles spaced apart a predetermined distance and mounted for simultaneous vertical movement, said needles each having an eye therethrough in the proximity of the ends of needles, said eyes being aligned with each other;
  (b) a support located in the path of said vertical movement of said needles for supporting said material, said support having two apertures therethrough spaced apart said predetermined distance and in the path of said needles such that said needles pierce said material and extend through said apertures when in a lowered position, said support further having a slot extending between and connecting said apertures;
  (c) a threading block located below said support, said threading block having two vertically extending holes therein aligned with said needles such that said needles extend down into said holes when in said lowered position, a slot extending between and connecting said two vertically extending holes and a hole extending horizontally through said block and intersecting said two vertically extending holes and said slot and aligned with said needle eyes when said needles are in said lowered position;

(d) means for causing said needles to move downwardly through said material into said lowered position whereby said needles form holes through said material;

(e) means for feeding a stitch wire into said horizontal hole in said threading block and into said needle eyes when said needles are in said lowered position;

(f) means for cutting said stitch wire to a desired length greater than said predetermined distance after being fed into said threading block and said needle eyes whereby said stitch wire will be slidably positioned in said needle eyes;

(g) hold-down means located above said support, said hold-down means vertically movable between a raised position and a lowered position in which said material is compressed and held in position, said hold-down means including an opening therethrough aligned with said needles;

(h) a twisting mechanism mounted on said hold-down means, said twisting mechanism comprising a disk rotatably mounted on said hold-down means over said opening, said disk having two holes therethrough normally aligned with said needles through which said needles pass when in said lowered position;

(i) means for causing said needles to move upwardly whereby the two ends of said stitch wire are pulled upwardly by said needles through said holes formed through said material and through said two holes in said disks; and (j) means for rotating said disk to twist said stitch wire ends together.

References Cited
UNITED STATES PATENTS

| | | | |
|---|---|---|---|
| 1,119,223 | 12/1914 | Beam | 140—93 |
| 2,171,388 | 8/1939 | Berger | 140—93 |
| 2,177,739 | 10/1939 | Nolan | 140—93 |
| 2,555,768 | 6/1951 | Smith | 140—93 |
| 3,208,484 | 9/1965 | Lohr et al. | 140—149 |
| 3,384,006 | 5/1968 | Helligrath et al. | 140—93 |

CHARLES W. LANHAM, Primary Examiner

E. M. COMBS, Assistant Examiner

U.S. Cl. X.R.

140—93.6, 149